United States Patent
Scott (10) Patent No.: US 6,203,258 B1
(45) Date of Patent: Mar. 20, 2001

(54) SLOTTED COMPONENT AND METHOD OF MANUFACTURE THEREOF

(75) Inventor: David William Scott, Ruse (AU)

(73) Assignee: Bishop Steering Pty Limited, North Ryde (AU)

( * ) Notice: Subject to any disclaimer, the term of this patent is extended or adjusted under 35 U.S.C. 154(b) by 0 days.

(21) Appl. No.: 09/147,450

(22) PCT Filed: Jun. 25, 1997

(86) PCT No.: PCT/AU97/00404

§ 371 Date: Mar. 17, 1999

§ 102(e) Date: Mar. 17, 1999

(87) PCT Pub. No.: WO97/49596

PCT Pub. Date: Dec. 31, 1997

(30) Foreign Application Priority Data

Jun. 26, 1996 (AU) ................................................ PO 0647

(51) Int. Cl.⁷ ........................................................ B23D 5/02
(52) U.S. Cl. ........................................... 409/307; 409/305
(58) Field of Search ............................... 409/304, 305, 409/307, 346

(56) References Cited

U.S. PATENT DOCUMENTS

| | | | |
|---|---|---|---|
| 859,336 | * 7/1907 | Riddell | 409/346 |
| 3,765,305 | * 10/1973 | Bishop | 409/305 |
| 4,154,145 | * 5/1979 | Bishop | 409/307 |
| 5,292,214 | * 3/1994 | Bishop | 409/307 |
| 5,328,309 | * 7/1994 | Bishop et al. | 409/307 |
| 5,390,408 | * 2/1995 | Bishop et al. | 29/558 |

FOREIGN PATENT DOCUMENTS

| | | | |
|---|---|---|---|
| 16745/92 | 11/1992 | (AU) . | |
| 189579 | * 7/1906 | (DE) | 409/346 |
| 585968 | * 10/1933 | (DE) | 409/346 |
| 0220530 | * 4/1985 | (DE) | 409/304 |
| 682602 | * 9/1929 | (FR) | 409/346 |
| 720360 | * 10/1930 | (FR) | 409/346 |
| 234427 | * 5/1925 | (GB) | 409/346 |
| 2273271 | 6/1994 | (GB) . | |
| WO 8402889 | 8/1984 | (WO) . | |
| WO 8702319 | 4/1987 | (WO) . | |
| WO 88 01958 | 3/1988 | (WO) . | |

OTHER PUBLICATIONS

Patent Abstracts of Japan, M1603, p. 62, JP 6–32239.
Patent Abstracts of Japan, M 1150, p. 126, JP 3–128767.
Patent Abstracts of Japan, M 796, p. 51, JP 63–264235.

* cited by examiner

*Primary Examiner*—A. L. Wellington
*Assistant Examiner*—Adrian M. Wilson
(74) *Attorney, Agent, or Firm*—Arent Fox Kintner Plotkin & Kahn PLLC (57) ABSTRACT

The present invention is a one piece sleeve for a rotary valve, the sleeve comprising an array of communication slots formed in the bore of the sleeve, characterized in that at least a portion of the floor of one of said slots is convex. Figure depicts sleeve (1b) with arcuate slot (21b) which has a convex floor and is open ended at both axial extremities of surface (17b) of bore (16b) of sleeve (1b). This slot may preferably be used as a return slot on the sleeve.

6 Claims, 7 Drawing Sheets

SLOTTED COMPONENT AND METHOD OF MANUFACTURE THEREOF

TECHNICAL FIELD

This invention relates to a method and apparatus for manufacturing a plurality of longitudinally extending slots in the bore of a component. One example of such a component is the sleeve element of an automotive power steering rotary valve. More particularly the invention is directed towards sleeve elements having varied slot configurations and the manufacture thereof.

BACKGROUND ART

The prior art most closely related to that of the present invention is that covered by U.S. Pat. No. 5,328,309 (Bishop et al), U.S. Pat. No. 5,292,214 (Bishop et al) and U.S. Pat. No. 5,390,408 (Bishop et al). These prior art references relate to "slotting machines" which machine the slots in the bore of power steering valve sleeves. The design of these machines calls for each of the slots to be scooped out of the bore of a turned blank by a finger-like cutting tool mounted on a cutting spindle which angularly reciprocates about an axis in a series of progressively deeper cutting and return strokes so forming a (usually) closed chamber, or hydraulic port, which is arcuate in longitudinal section. The sleeve is held in a work holding collet, in turn mounted in a work holding spindle, having a rotational axis perpendicular to and offset with respect to the cutting spindle axis. By accurately indexing the work holding spindle upon completion of each slot, the required number of slots are precisely machined in the sleeve, usually 4, 6 or 8 slots for most automotive applications.

Such prior art slotting machines have always been arranged to form each slot longitudinally in the bore surface, which is at the time of cutting furthest from the cutting spindle axis. In view of this and having regard to the arcuate path of the cutting tool during each cutting stroke, the slot has necessarily had a concave floor. This has limited the nature and configuration of the slots that have been able to be formed. The concave slots typically used have been blind-ended, but in some designs the concave slots exit from either or both axial extremities of the sleeve bore surface to provide for oil return from the sleeve.

It has been found that the aforesaid limitations on slot configuration have imposed limitations on design of steering gear valves and an object of the invention is to alleviate that situation.

SUMMARY OF INVENTION

In a first aspect the present invention is a machine for machining slots longitudinally disposed within the bore of a sleeve, comprising a work holding device for holding said sleeve, at least one cutting tool mounted on a cutting spindle, the axis of said cutting spindle being offset from and substantially at right angles to the axis of said sleeve, means of supporting said cutting spindle for angular reciprocation to effect cutting strokes of said tool relative to the surface of said bore, infeed means to permit said cutting tool to execute a succession of progressively deeper cuts in relation to said bore of the sleeve, characterised in that when said cutting tool is cutting at least one of said slots, the cutting tool engages the surface of the bore at a location substantially closest to said axis of the cutting spindle.

Preferably the cutting operation takes place in a substantially diametral plane and the location closest to said axis of the cutting spindle therefore lies in this substantially diametral plane.

Preferably the cutting tool is adapted to effect a convex path with respect to the surface of the bore which it is engaging.

In a second aspect the present invention is a machine for machining slots longitudinally disposed within the bore of a sleeve, comprising a work holding device for holding said sleeve, at least one tool head carrying cutting means, said tool head mounted on or integral with a cutting spindle, the axis of said cutting spindle being offset from and substantially at right angles to the axis of said sleeve, means of supporting said cutting spindle for angular reciprocation to effect cutting strokes of said cutting means relative to the surface of said bore, infeed means to permit said cutting means to execute a succession of progressively deeper cuts in relation to said bore of the sleeve, characterised in that said cutting means comprises of two or more independent cutting tools.

Preferably in a first embodiment at least one of the cutting tools is adapted to effect a convex path with respect to the surface of the bore which it is engaging.

Preferably in a second embodiment at least one of the cutting tools is adapted to effect a concave path with respect to the surface of the bore which it is engaging.

In a third aspect the present invention is a one piece sleeve for a rotary valve, the sleeve comprising an array of communication slots formed in the bore of the sleeve, characterised in that at least a portion of the floor of one of said slots is convex.

Preferably in one embodiment the slot having a convex floor portion is a return slot which extends longitudinally to at least one axial extremity of said bore surface.

BRIEF DESCRIPTION OF THE DRAWINGS

The present invention will now be described by way of example with reference to the accompanying drawings in which.

MODE OF CARRYING OUT INVENTION

Figure 1:
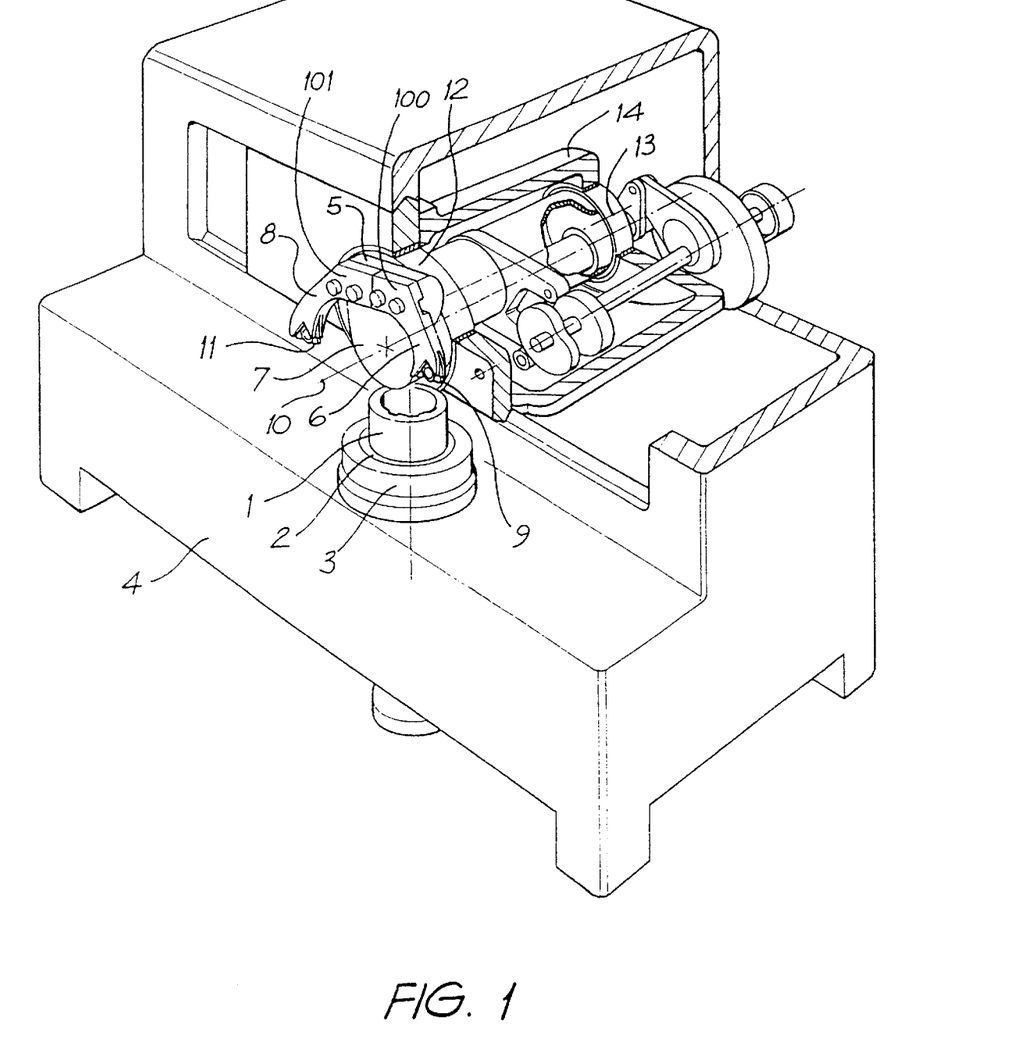
FIG. 1 is a sectioned perspective view of a slotting machine in accordance with one embodiment of the present invention.

FIG. 1 shows a slotting machine which holds sleeve 1 in collet 2 of work holding spindle 3 which is mounted for both rotation and axial sliding in machine base 4. A tool head 5 extends from, and in this embodiment integral with, cutting spindle 7. Cutting means comprises cutting tool holders 100 and 101, respectively incorporating arms (or finger-like projections) 6 and 8, mounted to tool head 5. Arms 6 and 8 of tool holders 100 and 101 provide mounting for cutting tools 9 and 11 respectively. Cutting spindle 7 oscillates angularly through an angle of approximately 45 degrees and cutting tools 9 and 11 are shown in their uppermost position. Cutting spindle 7 is journalled for rotation about an axis 10 within spindle carrier 12 which is itself journalled about an axis 13 in cutting capsule 14.

During the cutting operation only one of cutting tools 9 and 11 is used at any one time, and the reciprocation of cutting spindle 7 about axis 10 imparts an arcuate cutting stroke to the cutting tool being used, whilst oscillation of spindle carrier 12 imparts the necessary retraction motion at the end of the cutting stroke.

The cam drive arrangement for imparting reciprocating motion to cutting tools 9 and 11, the former which is housed within cutting capsule 14, is not described herein as it is fully covered in U.S. Pat. No. 5,292,214 (Bishop et al). The infeed mechanism may be of a mechanical cam driven type as described in the above referenced prior art or of a suitable numerically controlled servo-drive mechanism, adapted to impart relative linear horizontal motion between the cutting capsule 14 and the sleeve, thereby providing a means for infeeding one of the cutting tools during a cutting operation.

The work holding spindle (3) is also adapted for axial (vertical) linear movement which may in operation be similar to that described in the above referenced prior art U.S. Pat. No. 5,328,309 (Bishop et al), or alternatively by a suitable numerically controlled servo-drive means. This allows for the sleeve to axially clear the cutting tool. However, in another not shown embodiment the relative vertical linear movement between the work holding spindle and the cutting tool may be achieved by providing a vertically movable cutting capsule.

Figure 2:
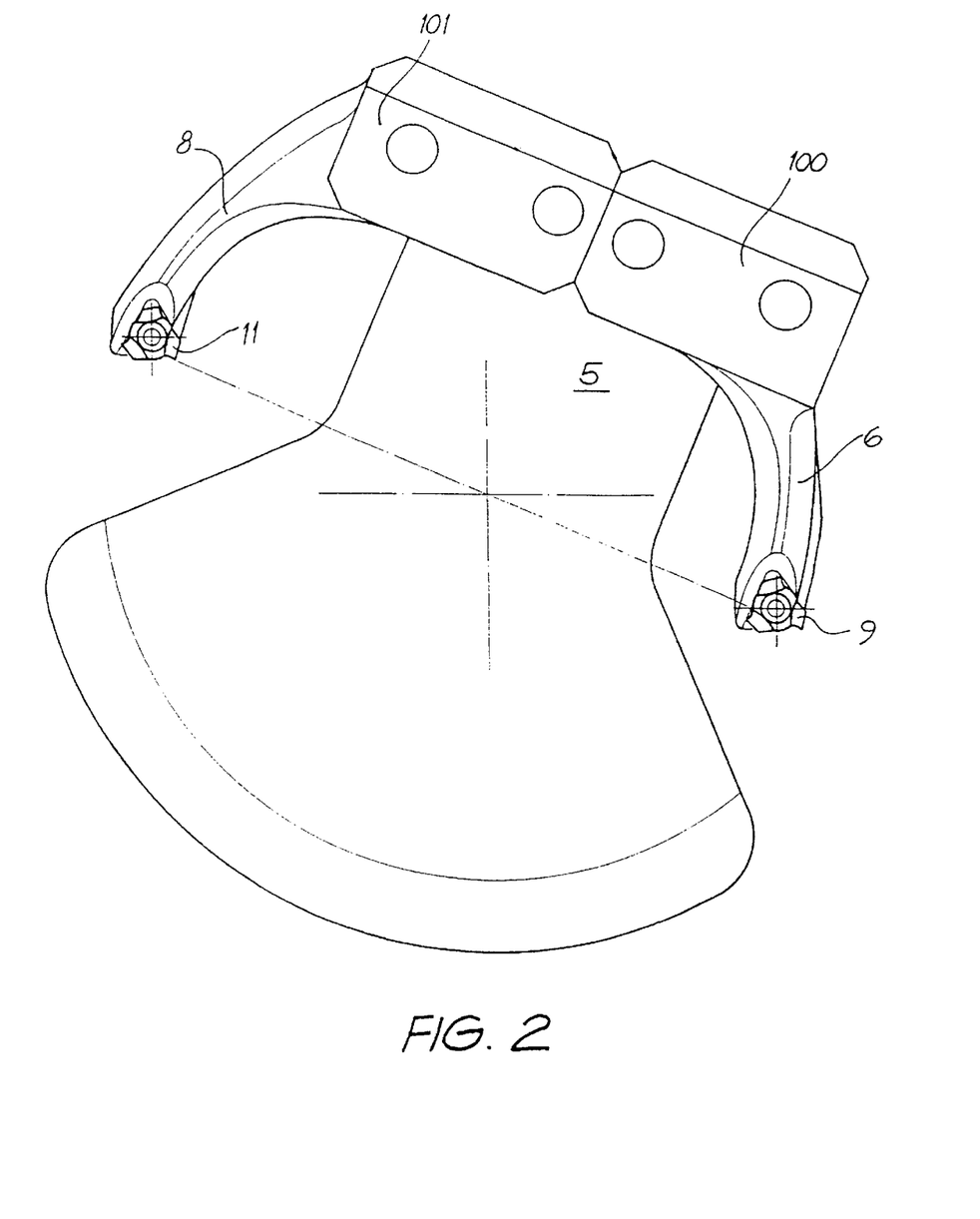
FIG. 2 is an elevational view of the tool head and cutting means of the embodiment shown in FIG. 1.

FIG. 2 shows an elevational view in isolation of tool head 5 and cutting tools 9 and 11, mounted on arms 6 and 8 of cutting tool holders 100 and 101 respectively. Whilst in this embodiment cutting tool holders 100 and 101 are each independent from one another and may each be separately removably attached to tool head 5, it should be readily understood that cutting tool holders 100 and 101 may be formed as a single component.

Figure 3:
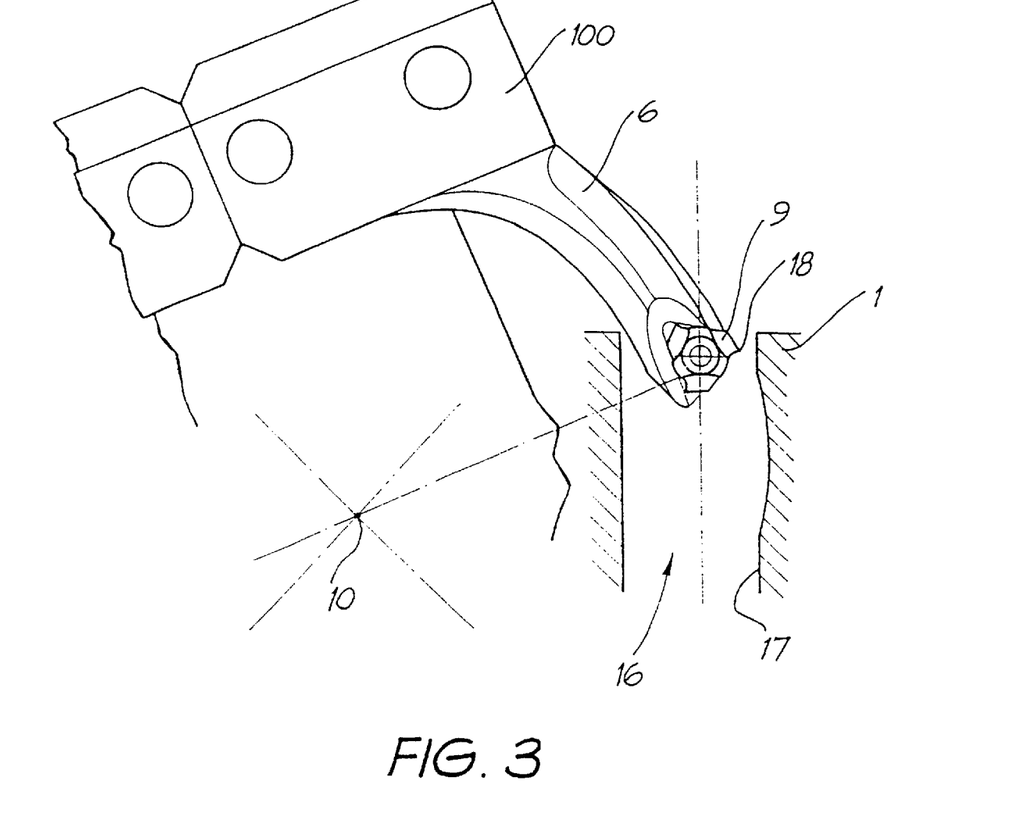
FIG. 3 is a partial vertical cross-section of a sleeve in a diametral plane with a blind-ended slot shown in relation to a cutting tool.

FIG. 3 shows sleeve 1 in its relation to a cutting tool 9 mounted on arm 6 of toolholder 100, when cutting a blind-ended concave arcuate slot 15 of the known type in bore 16. The angular reciprocation of the cutting tool 9 is in a substantially diametral plane of bore 16 (ie in the plane of the section) and engages surface 17 of bore 16 in the diametral plane furthest away from cutting spindle axis 10. In such an arrangement cutting tip 18 of cutting tool 9 projects outwardly away from tool head 5.

As the cutting capsule 14 is linearly (horizontally) movable with respect to the tool head 5 and work holding spindle (3) can be moved axially (vertically), sleeve 1 is able to be repositioned such that cutting tool 11 may be utilised to cut a slot, or a portion of a slot, into another portion of surface 17 of bore 16.

Figure 4:
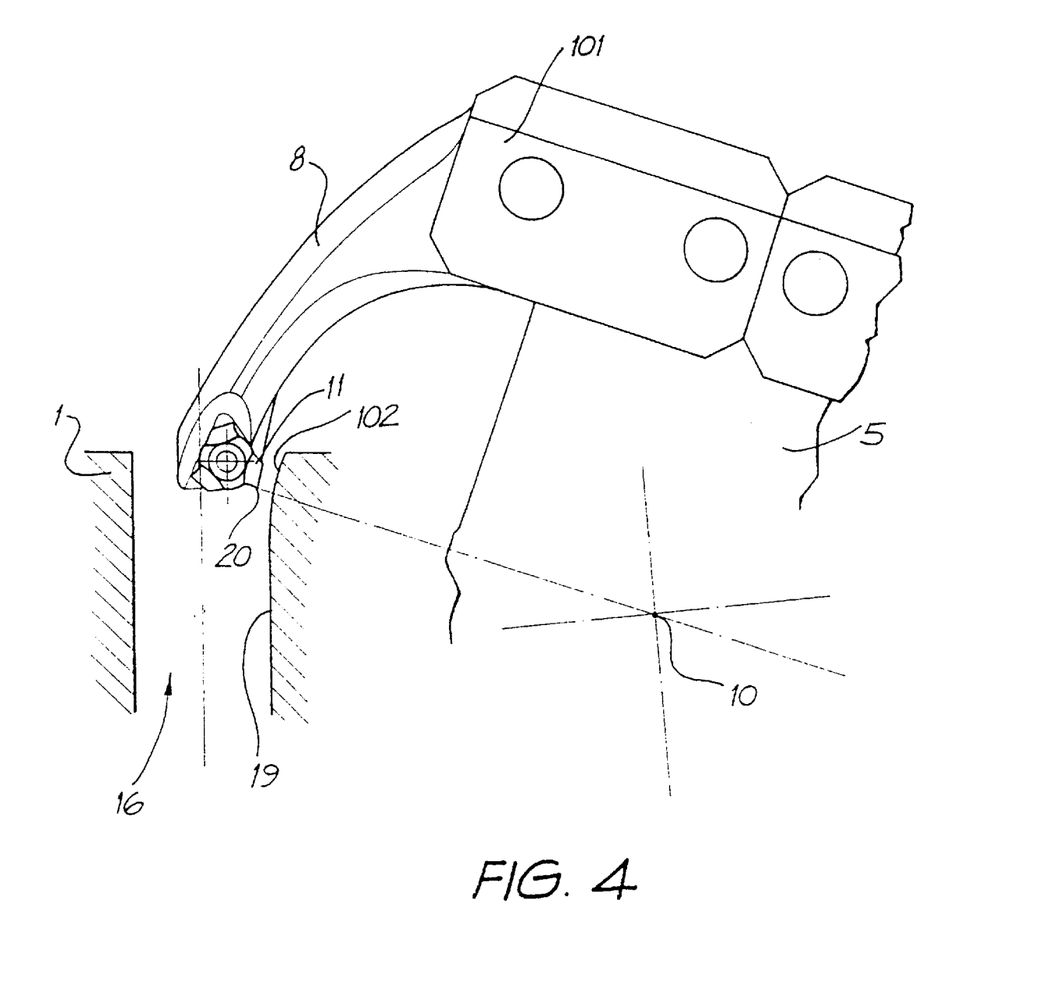
FIG. 4 is a partial vertical cross-section of a sleeve in a diametral plane with a convex slot portion shown in relation to a cutting tool.

FIG. 4 shows sleeve 1 in its relation to cutting tool 11 mounted on arm 8 of cutting tool holder 101. The angular reciprocation of cutting tool 11 is again in a substantially diametral plane of bore 16 and engages surface 19 of bore 16 in the diametral plane closest to the cutting spindle axis 10. Cutting tip 20 of cutting tool 11 projects inwardly towards tool head 5. Such an arrangement allows for slot floors or portions of slot floors to be cut which are convex rather than concave as at 102. Use of slot floors with convex portions will be later described and shown in FIGS. 7(b)–7(e).

Figure 5:
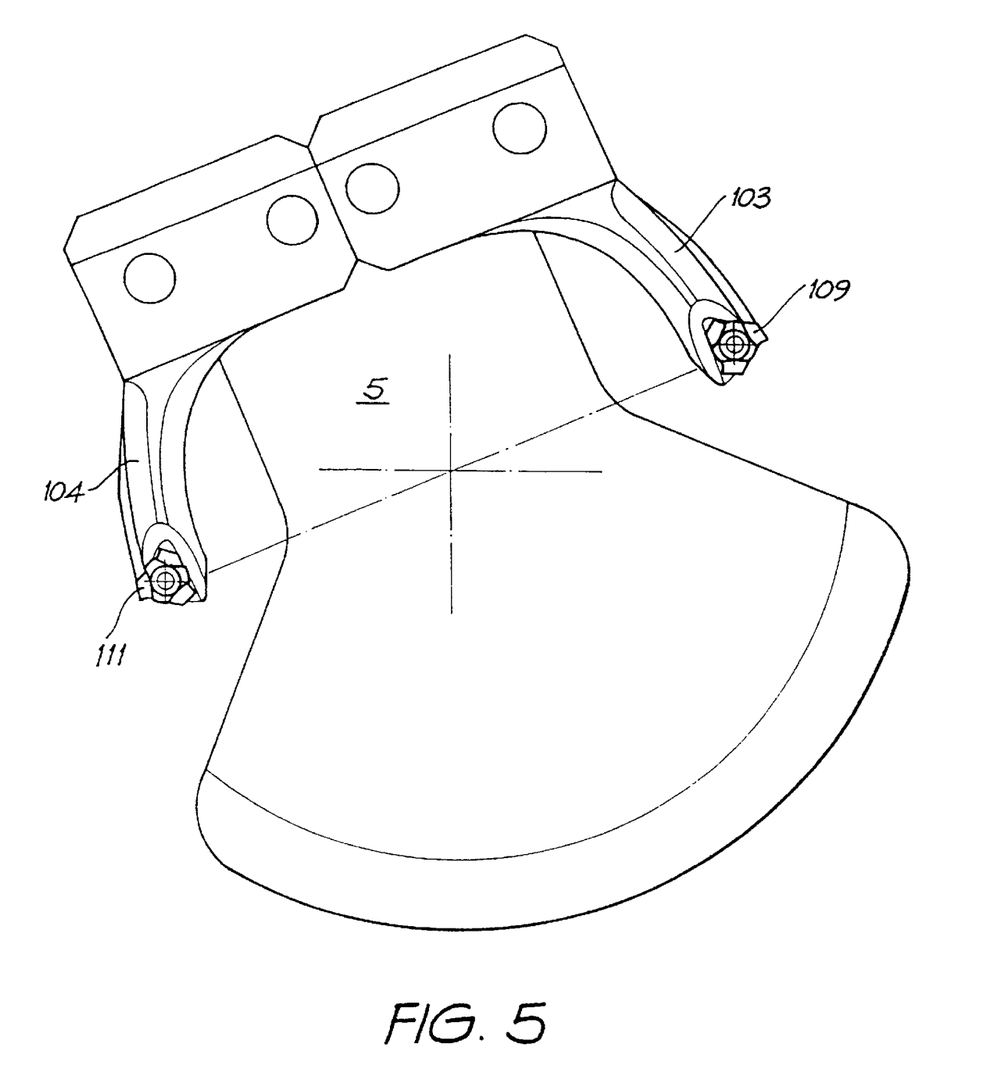
FIG. 5 is an elevational view of a second embodiment of tool head and cutting means.

Whilst the first embodiment of tool head 5 shown in FIG. 2 utilises finger-like cutting tool holders 100 and 101 which are able to cut concave and convex slot portions respectively, it is possible in a second embodiment (as shown in FIG. 5), to have two finger-like cutting tool holders 103 and 104, both of which are for cutting slots with concave floor portions. Such an embodiment could be used for machining slots of two different widths on a sleeve in a single machine as shown in FIG. 1, by using different width cutting tips on cutting tools 109 and 111.

Figure 6:
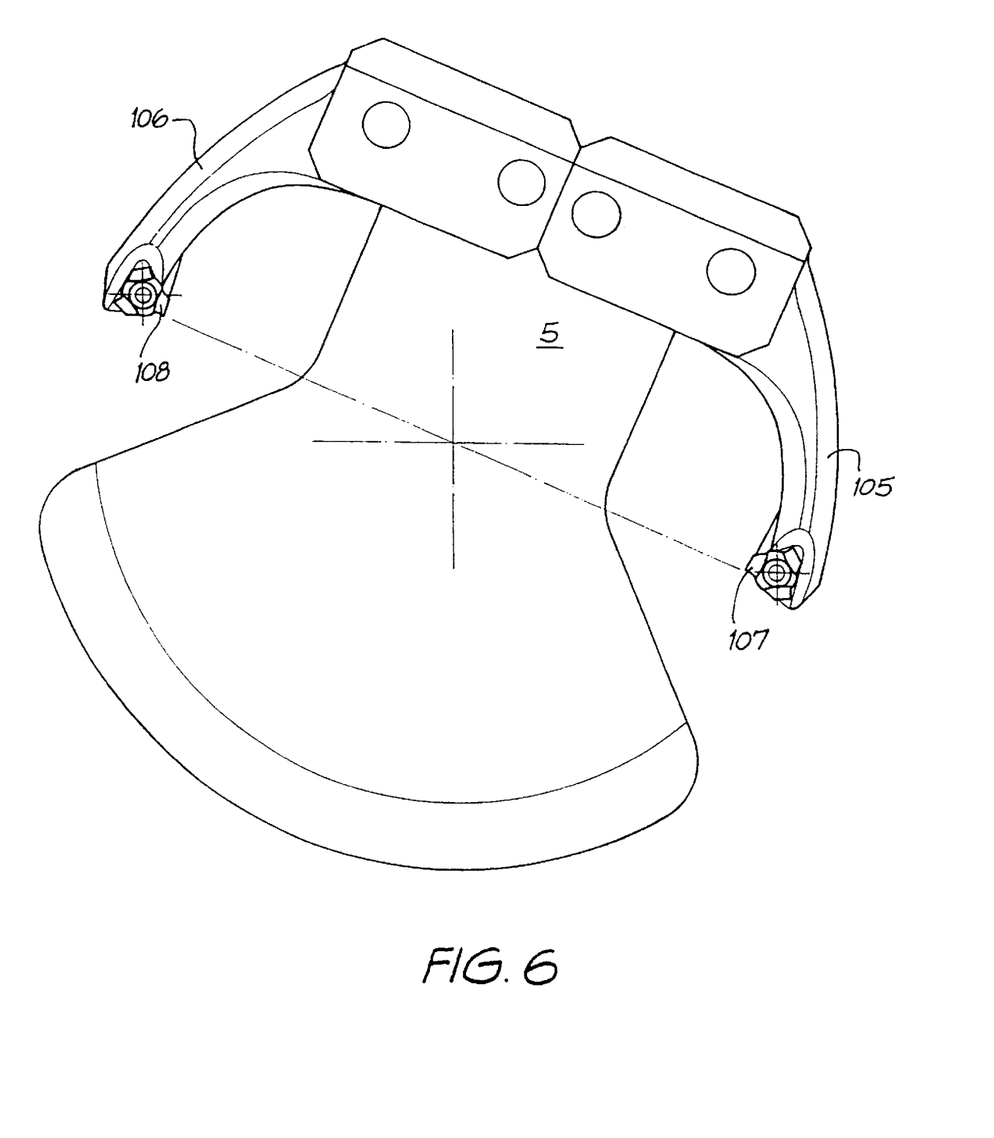
FIG. 6 is an elevational view of a third embodiment of tool head and cutting means.

In a third embodiment as shown in FIG. 6 two finger-like cutting tool holders 105 and 106 are both arranged for cutting slots with convex floor portions. Again, such an embodiment could be used for machining slots of two different widths on a sleeve in a single machine as shown in FIG. 1, by using different width cutting tips on cutting tools 107 and 108.

Now referring to FIGS. 7(a) to 7(e), five different embodiments of slots 21(a) to 21(e) are shown in sleeves 1(a) to 1(e) respectively. For purposes of clarity outside features of the sleeve have been omitted and the dimensions appropriately altered. Also for ease of reference only one slot is shown in each sleeve. All five slot embodiments can be machined on the machine of the first embodiment of the present invention.

Figure 7A:
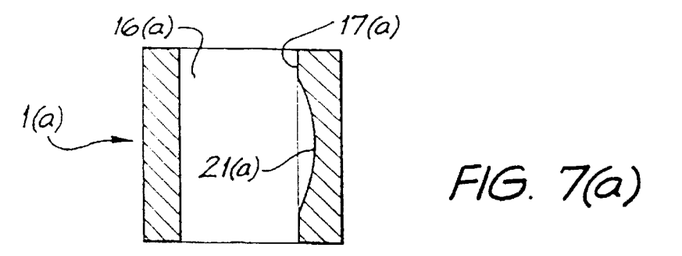
FIGS. 7(a) to 7(e) show five sleeves with various slot configurations.

FIG. 7(a) depicts sleeve 1(a) with blind-ended arcuate slot 21(a) which has a concave floor. This slot is similar to slot 15 shown in FIG. 3 and may preferably be used as an inlet slot on the sleeve. Slot 21(a) is cut in a conventional manner discussed earlier on with reference to the tooling arrangement shown in FIG. 3, where angular reciprocation of the cutting tool 9 is in a diametral plane of bore 16 and engages surface 17(a) of bore 16(a) in the diametral plane furthest away from the cutting spindle axis 10.

Figure 7B:
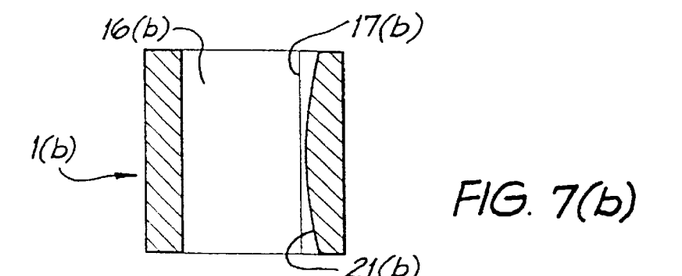

FIG. 7(b) depicts sleeve 1(b) with arcuate slot 21(b) which has a convex floor and is open ended at both axial extremities of surface 17(b) of bore 16(b) of sleeve 1(b). This slot may preferably be used as a return slot on the sleeve. Slot 21(b) is cut in the manner discussed earlier on with reference to the tooling arrangement shown in FIG. 4, where angular reciprocation of cutting tool 11 is in a diametral plane of bore 16(b) and engages surface 17(b) of bore 16(b) in the diametral plane closest to cutting spindle axis 10.

Figure 7C:
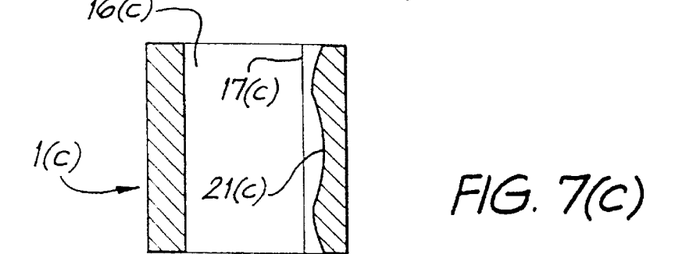

FIG. 7(c) depicts sleeve 1(c) with slot 21(c) having a slot comprising three distinct arcuate slot portions and is open ended at both axial extremities of surface 17(c) of bore 16(c) of sleeve 1(c). The central slot portion has a concave floor, whilst the two outer arcuate slot portions have convex floors. This slot may also preferably be used as a return slot on the sleeve. Slot 21(c) is machined by cutting the central concave portion of the slot by the tooling arrangement shown in FIG. 3, whilst the two outer convex portions may be machined by the tooling arrangement of FIG. 4. As the machine of the first embodiment has a double headed tool adapted to cut both concave and convex portions, both the convex and concave portions of slot 21(c) may be cut on the same machine.

Figure 7D:
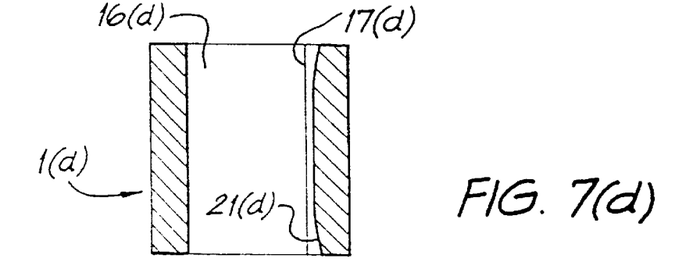

FIG. 7(d) depicts sleeve 1(d) with slot 21(d) which is open ended at both axial extremities of surface 17(d) of bore 16(d) of sleeve 1(d). The central floor portion of slot 21(d) is substantially flat, whilst the two outer arcuate slot portions have convex floors. This slot may also preferably be used as a return slot on the sleeve. The two outer arcuate slot portions may be cut in the manner discussed earlier on with reference to the tooling arrangement shown in FIG. 4. The substantially flat central portion of slot 21(d) may alternatively be convex with a substantially large arc radius.

Figure 7E:
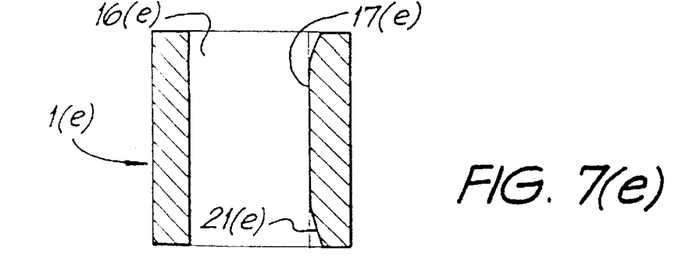

FIG. 7(e) depicts sleeve 1(e) with sleeve 21(e) having two convex slot portions, at opposed axial extremities of surface 17(*e*) of bore 16(*e*) of sleeve 1(*e*). The two convex slot portions may be cut in the manner discussed earlier on with reference to the tooling arrangement shown in FIG. 4.

The slots shown in FIGS. 7(*b*), 7(*c*), 7(*d*) and 7(*e*), as well as other not shown slot configurations utilising convex slot floor portions, are suitable for use as return slots on sleeves for use with valves disclosed in our International Patent Application PCT/AU96/00266 entitled "Rotary Valve for Power Steering Gear" and International Patent Application PCT/AU96/00267 entitled "Power Steering Gear Valve" the disclosure of which is incorporated herein by reference.

It will be recognised by persons skilled in the art that numerous variations and modifications may be made to the invention without departing from the spirit and scope of the invention.

What is claimed is:

1. A machine for machining slots longitudinally disposed within a bore of a sleeve, comprising a work holding device for holding said sleeve, at least one cutting tool mounted on a cutting spindle, an axis of said cutting spindle being offset from and substantially at right angles to an axis of said sleeve, means of supporting said cutting spindle for angular reciprocation to effect cutting strokes of said cutting tool relative to a surface of said bore, infeed means to permit said cutting tool to execute a succession of progressively deeper cuts in relation to said bore of the sleeve, characterized in that when said cutting tool is cutting at least one of said slots, the cutting tool engages the surface of the bore at a location substantially close to said axis of the cutting spindle.

2. A machine as claimed in claim 1, wherein said cutting tool is rotatable in a substantially diametral plane of said bore.

3. A machine as claimed in claim 1, wherein said cutting tool is adapted to effect a convex path with respect to the surface of the bore which it is engaging.

4. A machine for machining slots longitudinally disposed within a bore of a sleeve, comprising a work holding device for holding said sleeve, at least one tool head carrying cutting means, said tool head mounted on or integral with a cutting spindle, an axis of said cutting spindle being offset from and substantially at right angles to an axis of said sleeve, means of supporting said cutting spindle for angular reciprocation to effect cutting strokes of said cutting means relative to a surface of said bore, infeed means to permit said cutting means to execute a succession of progressively deeper cuts in relation to said bore of the sleeve, characterized in that said cutting means comprises a plurality of finger-like cutting tool holders each of which carries at least one cutting tool wherein at least one of said finger-like cutting tool holders and their respective cutting tools are adapted to effect a convex path with respect to the surface of the bore which is engaging.

5. A machine as claimed in claim 4, wherein at least one of said finger-like cutting tool holders and their respective cutting tools are adapted to effect a concave path with respect to the surface of the bore which it is engaging.

6. A machine as claimed in claim 4, wherein at least one cutting tool carried by one of the finger-like cutting tool holders has a cutting tip of different width to that of a cutting tip on the at least one cuffing tool carried by the other finger-like cutting tool holder.

* * * * *